US012741548B2

(12) United States Patent
Catimel

(10) Patent No.: US 12,741,548 B2
(45) Date of Patent: Sep. 22, 2026

(54) VEHICLE WITH ELECTRIC DRIVE AND METHOD FOR CONTROLLING SUCH A VEHICLE

(71) Applicant: LES COMPTOIRS D'EOLE, La Begude-de-Mazenc (FR)

(72) Inventor: Michel Catimel, La-Begude-de-Mazenc (FR)

(73) Assignee: LES COMPTOIRS D'EOLE, La-Begude-de-Mazenc (FR)

( * ) Notice: Subject to any disclaimer, the term of this patent is extended or adjusted under 35 U.S.C. 154(b) by 63 days.

(21) Appl. No.: 18/850,667

(22) PCT Filed: Mar. 21, 2023

(86) PCT No.: PCT/FR2023/050393
§ 371 (c)(1),
(2) Date: Sep. 25, 2024

(87) PCT Pub. No.: WO2023/180664
PCT Pub. Date: Sep. 28, 2023

(65) Prior Publication Data

US 2025/0214449 A1 Jul. 3, 2025

(30) Foreign Application Priority Data

Mar. 25, 2022 (FR) ..................................... 22/02704

(51) Int. Cl.
*B60L 15/20* (2006.01)

(52) U.S. Cl.
CPC ....... *B60L 15/2054* (2013.01); *B60L 15/2045* (2013.01); *B60L 2240/421* (2013.01);
(Continued)

(58) Field of Classification Search
CPC ............. B60L 15/2054; B60L 15/2045; B60L 2240/421; B60L 2240/423;
(Continued)

(56) References Cited

U.S. PATENT DOCUMENTS 7,469,758 B2 * 12/2008 Iwanaka ................. F02N 11/04 903/910
8,874,299 B2 * 10/2014 Hirata ...................... B60K 6/48 701/22
(Continued)

FOREIGN PATENT DOCUMENTS

DE 102006044894 A1 4/2008
EP 3517346 A1 7/2019
(Continued)

OTHER PUBLICATIONS

International Search Report for corresponding application PCT/FR2023/050393 filed Mar. 21, 2023; Mail date Jul. 6, 2023.

*Primary Examiner* — Mussa A Shaawat
(74) *Attorney, Agent, or Firm* — CANTOR COLBURN LLP

(57) ABSTRACT

The invention relates to a vehicle with electric drive (1), comprising driven wheels (3); a propulsion unit (10) including at least one electric power motor (11) and a power transmission mechanism (20) transmitting power between said power motor (11) and the driven wheels (3); and a regulator mechanism (30) comprising a regulating motor (31) and an irreversible reduction mechanism (33) interposed between the regulating motor (31) and the power transmission mechanism (20) and acting on the power transmission mechanism (20) in such a way as to allow the value of the mechanical torque transmitted by the power transmission mechanism (20) to the driven wheels (3) to be adjusted as a function of the rotational speed of the regu-
(Continued)

lating motor (31). The invention also relates to a method for controlling such an electrically driven vehicle (1).

11 Claims, 4 Drawing Sheets

(52) U.S. Cl.
CPC ... *B60L 2240/423* (2013.01); *B60L 2240/486* (2013.01); *B60L 2250/28* (2013.01)

(58) Field of Classification Search
CPC ........... B60L 2240/486; B60L 2250/28; B60L 2240/16; B60L 2240/507; B60L 1/003; F16H 3/724; F16H 1/16; B60K 2001/001
See application file for complete search history.

(56) References Cited

U.S. PATENT DOCUMENTS 9,487,104 B2 * 11/2016 Jang ...................... B60W 20/40
9,975,451 B2 * 5/2018 Shepley .............. B60L 15/2009
11,230,288 B1 * 1/2022 Tokarz .................. B60W 20/40
11,840,134 B2 * 12/2023 McGrew, Jr. ............ B60K 1/02
2003/0015874 A1 * 1/2003 Abe ...................... B60W 20/12 290/40 C
2005/0228553 A1 * 10/2005 Tryon ..................... B60L 50/16 701/22
2006/0111211 A1 5/2006 Kefti-Cherif et al.
2007/0021267 A1 * 1/2007 Obayashi .............. B60W 10/08 477/107
2008/0230289 A1 * 9/2008 Schoon ............... F16H 57/0427 180/65.6
2011/0153127 A1 * 6/2011 Weslati .................. G01C 21/26 701/1
2014/0010652 A1 * 1/2014 Suntharalingam ..... B64D 27/33 475/5
2015/0025720 A1 * 1/2015 Bae ....................... B60W 20/10 903/902
2015/0298680 A1 * 10/2015 Matthews ............. B60W 10/08 180/65.265
2016/0101773 A1 * 4/2016 Hata ...................... B60K 6/365 180/65.265
2016/0144850 A1 * 5/2016 Debert .................. B60W 20/40 180/65.265
2016/0221468 A1 * 8/2016 Suzuki .................... B60L 3/106
2017/0015298 A1 * 1/2017 Imamura ................ B60K 6/445
2017/0361831 A1 * 12/2017 Johri ..................... B60W 20/15
2018/0215372 A1 * 8/2018 Hosokawa ............ B60W 20/00
2018/0229623 A1 * 8/2018 Baeumler ........... B60L 15/2054
2019/0283612 A1 * 9/2019 Morita ................... B60K 17/08
2019/0322266 A1 * 10/2019 Fukushiro ............. B60W 20/10
2020/0164862 A1 * 5/2020 Muta ..................... B60W 10/08
2020/0231046 A1 * 7/2020 Taniguchi ............ B60K 7/0007
2021/0140523 A1 * 5/2021 Kim ...................... F16H 37/046
2021/0162979 A1 * 6/2021 Ariyoshi ......... B60W 30/18127
2021/0188098 A1 * 6/2021 Schuenemann ......... B60L 3/108
2022/0033097 A1 * 2/2022 Botti .................... B64D 35/023
2022/0212534 A1 * 7/2022 Samie ...................... B60K 6/40
2022/0355703 A1 * 11/2022 Fatemi ...................... B60L 3/04
2023/0095737 A1 * 3/2023 Yagasaki ............. B60W 10/101 701/22

FOREIGN PATENT DOCUMENTS

FR 2847015 A1 5/2004
FR 2997247 A1 4/2014

* cited by examiner

VEHICLE WITH ELECTRIC DRIVE AND METHOD FOR CONTROLLING SUCH A VEHICLE

TECHNICAL FIELD

The present disclosure concerns the field of electrically-driven vehicles, such as pure electric vehicles and hybrid vehicles.

The disclosure also concerns a method for piloting such electrically-driven vehicles.

BACKGROUND

An electrically-driven vehicle is, generally, a vehicle comprising a powertrain comprising an electric machine coupled to the drive wheels of the vehicle. This electric machine (also called electric power motor) is configured to allow a transmission of a mechanical torque to the drive wheels in order to advance the vehicle.

Generally, such a transmission is carried out through a gearbox comprising one or more reduction elements allowing the motor to transmit a sufficient torque to the drive wheels, particularly during acceleration or starting phases.

Thus, in the existing electrically-driven vehicles, it is common to use a constant power reducer making it possible to multiply the torque transmitted by the electric machine to the drive wheels. For example, certain vehicles are equipped with a main reducer having a reduction ratio of 1/10 which allows, on certain particular operating phases, to multiply by 10 the mechanical torque transmitted to the drive wheels.

However, although these arrangements make it possible to provide the sufficient torque to the drive wheels for starting or acceleration, they require the operation of the electric machine at a high rotational speed. Thus, a paradox in the operation of the electrically-driven vehicles is that they consume more on the highway than in the city. The mileage range of electrically-driven vehicles is therefore reduced, whereas the electric machine could be adapted to run the drive wheels without exponential consumption of the electric energy provided by the electric machine.

BRIEF SUMMARY

The present disclosure aims to propose a solution which responds to all or part of the aforementioned problems.

This goal can be achieved through the implementation of an electrically-driven vehicle, comprising:

- drive wheels;
- a powertrain including at least one electric power motor and a power transmission mechanism between said power motor and the drive wheels, the power transmission mechanism comprising a main reducer interposed between the power motor and the drive wheels, said main reducer having an epicyclic train architecture with at least one stage, where each stage comprises:
  - a planet carrier;
  - a central sun shaft centered about a reduction rotation axis;
  - a peripheral sun shaft externally surrounding the central sun shaft, and being coaxial with the central sun shaft about the reduction rotation axis;
  - at least one planetary gear, disposed between the central sun shaft and the peripheral sun shaft, meshing with the central sun shaft and the peripheral sun shaft, and being configured to rotate about the reduction rotation axis;

- an accelerator pedal;
- a regulating mechanism distinct from the powertrain, the regulating mechanism comprising:
- an electric regulating motor;
- an irreversible reduction mechanism interposed between the regulating motor and the power transmission mechanism, and acting on the power transmission mechanism in a manner making it possible to adjust, as a function of the rotational speed of the regulating motor, the reduction rate of the main reducer, to modulate a rotational speed of the power motor in order to adjust the value of the mechanical torque transmitted by the power transmission mechanism to the drive wheels, the irreversible reduction mechanism prohibiting a transmission of mechanical forces from the regulating motor to the drive wheels and prohibiting a transmission of mechanical forces from the power transmission mechanism to the regulating motor, said irreversible reduction mechanism being a worm and wheel system whose worm is coupled in rotation with an output shaft of the regulating motor and whose wheel is coupled in rotation with the planet carrier of one stage of said at least one stage of the main reducer, a rotation of the wheel rotating said planet carrier in a direction making it possible to increase the overall reduction rate of the power transmission mechanism;
- an electronic control unit ensuring piloting of the power motor and of the regulating motor as a function of control laws recorded in a memory of the electronic control unit, said control laws being at least dependent on an action on the accelerator pedal of the electrically-driven vehicle.

The arrangements previously described make it possible to propose an electrically-driven vehicle in which an irreversible reduction mechanism is used to monitor the torque of the power motor. The irreversible nature of the irreversible reduction mechanism makes it possible to mechanically isolate the regulating motor from the powertrain so that no power delivered by the power motor is transmitted to the regulating motor and vice versa.

The electrically-driven vehicle may also have one or more of the following characteristics, taken alone or in combination.

According to one embodiment, the regulating motor comprises an output shaft, said output shaft being secured in rotation to an element of the irreversible reduction mechanism.

According to one embodiment, the electrically-driven vehicle comprises at least one electric energy storage system configured to supply electric energy to at least one electric motor chosen from the power motor of the powertrain and the regulating motor.

According to one embodiment, the main reducer has an overall reduction rate of 0.25 between an input mechanically connected to an output of the power motor and an output mechanically connected to the drive wheels. According to one embodiment, the main reducer comprises a single stage, said stage having a reduction rate equal to 0.25.

According to one embodiment, the main reducer of the power transmission mechanism comprises at least two stages mounted in series.

According to one embodiment, the main reducer comprises reverse idler gears disposed between each stage.

According to one embodiment, each stage has a reduction rate, said reduction rate of each stage being chosen so that an overall reduction rate of the main reducer is comprised between 1/3 and 1/5.

According to one embodiment, the main reducer comprises three stages mounted in series where each stage has a reduction rate of 0.63, so that the main reducer has an overall reduction rate of 0.25.

According to one embodiment, the wheel of the worm and wheel system is secured in rotation to the planet carrier of one stage of the at least one stage of the main reducer.

According to one embodiment, the worm of the worm and wheel system is secured in rotation to the output shaft of the regulating motor.

According to one embodiment, the electrically-driven vehicle comprises a first gear and a second gear disposed between the wheel of the worm and wheel system and the planet carrier of one of the stages of the main reducer, said first and second gears being meshed with each other, the first gear being further meshed with the wheel of the worm and wheel system, and the second gear being secured in rotation to the planet carrier.

According to one embodiment, said first and second gears are mounted in series between the wheel of the worm and wheel system and a planet carrier of one of the stages of the reducer.

According to one embodiment, the worm and wheel system is configured so as to have a reduction rate comprised between 1/8 and 1/12.

According to one embodiment, the reduction rate of the worm and wheel system is equal to 1/10.

According to one embodiment, the worm comprises a thread having a thread angle less than or equal to 6°, and in particular substantially equal to 6°.

Thus, the worm and wheel system is deemed irreversible, the rotation of the wheel secured in rotation to the planet carrier being dependent on the rotation of the worm. Said worm is configured to retract, at the rotational speed of the regulating motor, by the force of the wheel of the worm and wheel system. The result is that an increase in the speed of the regulating motor implies a rise in the torque delivered to the drive wheels, by the power motor.

According to one embodiment, the worm and the wheel of the worm and wheel system comprise steel. For example, the contact surfaces between the wheel and the worm of the worm and wheel system are made of greased steel.

Thus and advantageously, the force induced on the worm is compensated by the dynamic friction force between the worm and the wheel, because the coefficient of friction of the steel on the steel is substantially equal to the sine of the thread angle.

The aim of the disclosure can also be achieved through the implementation of a method for piloting an electrically-driven vehicle, to pilot an electrically-driven vehicle according to one of the embodiments described above, the piloting method being implemented by the control unit and comprising:

- a phase of receiving setpoint by the control unit, in which a setpoint dependent on the actuation of the accelerator pedal of the electrically-driven vehicle is received, said setpoint being representative of an absolute value of a depression of the accelerator pedal;
- in the case where the absolute value of the depression of the accelerator pedal is strictly greater than an absolute value of threshold depression, implementing a regulation phase comprising a step of rotating the regulating motor so as to adjust, as a function of the rotational speed of the regulating motor, the reduction rate of the main reducer, to modulate the rotational speed of the power motor in order to adjust the value of the mechanical torque transmitted by the power transmission mechanism to the drive wheels, a direction of rotation of the regulating motor then rotating the worm of the worm and wheel system in a direction allowing said worm to retract by a mechanical force of the wheel on the worm;
- in all other cases, implementing a speed modulation phase, in which a value of the current provided by the power motor is modulated proportionally to the absolute value of the depression of the accelerator pedal, so as to modulate the torque transmitted by the power motor to the drive wheels.

The arrangements previously described make it possible to propose a method for piloting an electrically-driven vehicle in which a regulation phase is implemented to adjust the transmission of a mechanical torque to the drive wheels of the vehicle as a function of the absolute value of depression of the accelerator pedal. In fact, increasing the rotational speed of the regulating motor implies a rise in the torque delivered to the drive wheels by the power motor.

The piloting method may also have one or more of the following characteristics, taken alone or in combination.

According to one embodiment, the absolute value of threshold depression is equal to 50% of a total travel of depression of the accelerator pedal.

According to one embodiment, the modulation phase is implemented so that the current value provided by the power motor is modulated proportionally to the absolute value of the depression of the accelerator pedal between a zero current value and a maximum nominal current value corresponding to a maximum value likely to be provided by the power motor.

It is therefore well understood that, when the absolute value of the depression of the accelerator pedal is comprised between 0% and the absolute value of threshold depression, the torque provided by the power motor is modulated as a function of the absolute value of the depression of the accelerator pedal between a zero torque and a nominal value of the torque of the power motor.

According to one embodiment, during the regulation phase, the power motor provides a current whose value is equal to the maximum nominal current value.

It is therefore well understood that, when the absolute value of the depression of the accelerator pedal is strictly greater than the absolute value of threshold depression, the torque provided by the power motor is equal to the nominal value of the torque of the power motor, and the rotational speed of the regulating motor is modulated between 0 and a nominal rotational speed value of the regulating motor. For example, the nominal rotational speed value of the regulating motor is equal to 6000 rpm.

Thus, the rotation of the regulating motor makes it possible to induce an increase in the torque transmitted by the power motor to the drive wheels, through the main reducer.

According to one embodiment, the wheel of the worm and wheel system limits the rotation of the planet carrier to a speed depending on the rotational speed of the regulating motor.

According to one embodiment, the control laws stored in the memory of the control unit comprise all or part of the steps of the piloting method as described above.

BRIEF DESCRIPTION OF THE DRAWINGS

Other aspects, aims, advantages and characteristics of the disclosure will appear better on reading the following detailed description of preferred embodiments thereof, given by way of non-limiting example, and made with reference to the appended drawings on which.

DETAILED DESCRIPTION

In the figures and in the remainder of the description, the same references represent identical or similar elements. In addition, the different elements are not represented to scale so as to favor the clarity of the figures. Furthermore, the different embodiments and variants are not exclusive of each other and can be combined with each other.

Figure 1:
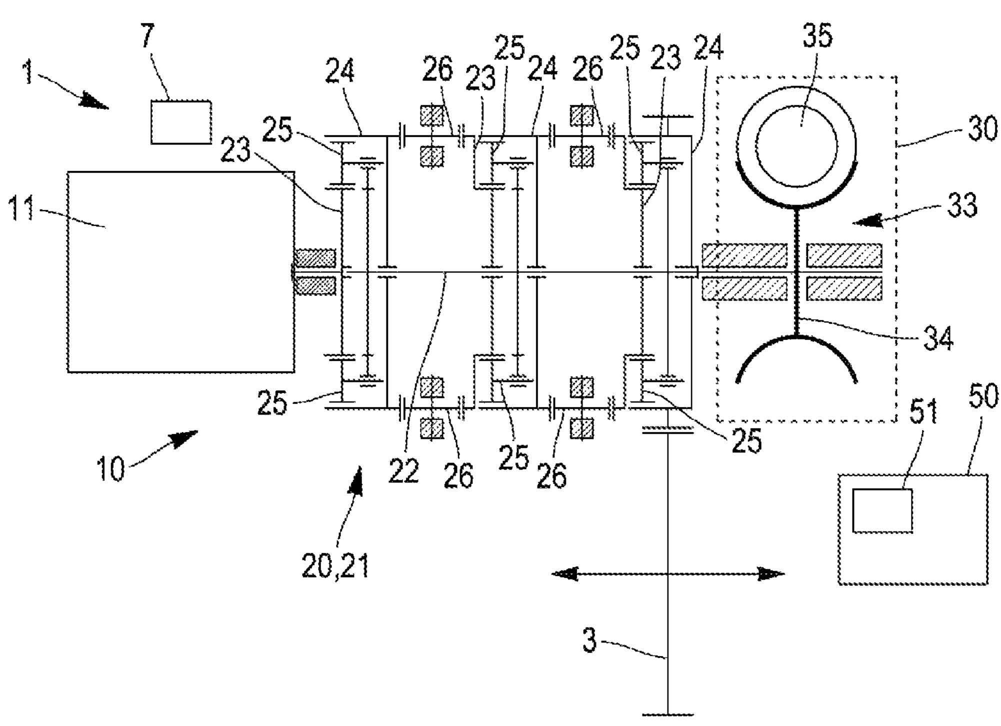
FIG. 1 is a schematic view of the electrically-driven vehicle according to a first embodiment.
Figure 2:
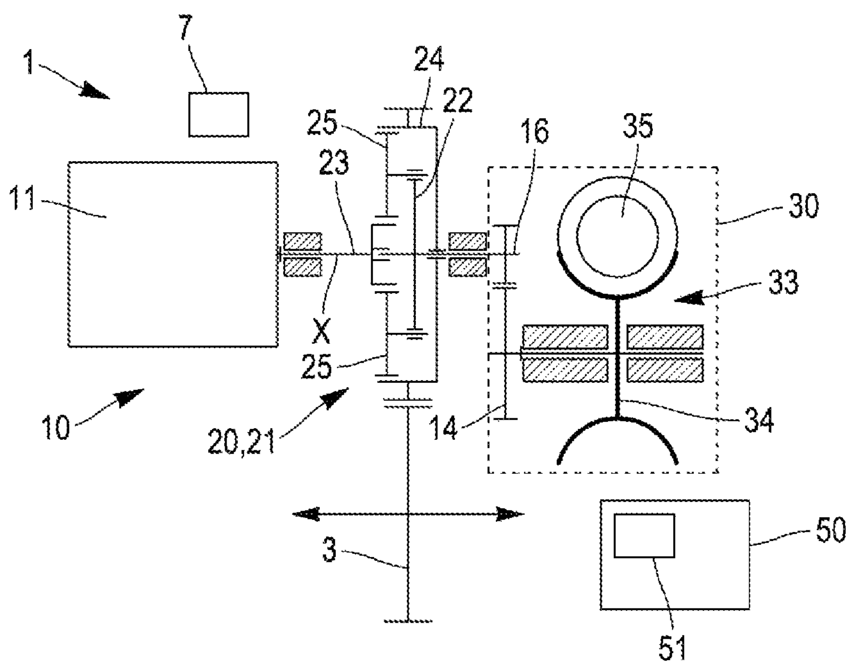
FIG. 2 is a schematic view of the electrically-driven vehicle according to a second embodiment.

As illustrated in FIGS. 1 and 2, the disclosure concerns an electrically-driven vehicle 1, comprising in particular drive wheels 3, and a powertrain 10 including at least one electric power motor 11. Generally, such an electrically-driven vehicle 1 comprises at least one electric energy storage system 7 such as a battery, which is configured to supply electric energy to the power motor 11. The power motor 11 is configured to rotate the drive wheels 3, in order to allow the advancing of the electrically-driven vehicle 1.

For this, the electrically-driven vehicle comprises a power transmission mechanism 20 interposed between said power motor 11 and the drive wheels 3. This power transmission mechanism 20 comprises a main reducer 21 interposed between the power motor 11 and the drive wheels 3. According to the embodiments represented in FIGS. 1 and 2, the main reducer 21 of the power transmission mechanism 20 has an epicyclic train architecture with at least one stage, where each step comprises:

- a planet carrier 22;
- a central sun shaft 23 centered about a reduction rotation axis X;
- a peripheral sun shaft 24 externally surrounding the central sun shaft 23, and being coaxial with the central sun shaft 23 about the reduction rotation axis X;
- at least one planetary gear 25, disposed between the central sun shaft 23 and the peripheral sun shaft 24, meshing with the central sun shaft 23 and the peripheral sun shaft 24, and being configured to rotate about the reduction rotation axis X.

Certain electrically-driven vehicles 1 of the state of the art propose a main reducer having a reduction rate of 1/10. This is advantageous for situations where strong acceleration is required, but detrimental for constant speed movement at high speed. Thus, it can be expected that the main reducer 21 of the electrically-driven vehicle 1 has an overall reduction rate of 0.25 between an input mechanically connected to an output of the power motor 11 and an output mechanically connected to the drive wheels 3. According to the variant represented in FIG. 2, the main reducer 21 comprises a single stage, said stage having a reduction rate equal to 0.25. Alternatively, and as represented in FIG. 1, the main reducer 21 of the power transmission mechanism 20 may comprise at least two stages mounted in series, and in particular three stages mounted in series. In the case where the main reducer 21 comprises several stages, it can be provided that each stage has a reduction rate chosen so that an overall reduction rate of the main reducer 21 is comprised between 1/3 and 1/5. Thus, if the main reducer 21 comprises three stages mounted in series, each stage can advantageously have a reduction rate of 0.63, so that the main reducer 21 has an overall reduction rate of 0.25. The articulation of the different stages of the main reducer can be implemented through reverse idler gears 26 disposed between each stage.

The electrically-driven vehicle 1 further comprises a regulating mechanism 30 distinct from the powertrain 10, which comprises an irreversible reduction mechanism 33, and an electric regulating motor 31. Advantageously, this electric regulating motor 31 can be supplied with electric energy by an electric energy storage system 7 identical to or different from that which supplies electric energy to the power motor 11. The regulating motor 31 can comprise an output shaft 32 secured in rotation to an element of the irreversible reduction mechanism 33.

The irreversible reduction mechanism 33 is interposed between the regulating motor 31 and the power transmission mechanism 20, and acts on the power transmission mechanism 20 in a manner making it possible to adjust, as a function of the rotational speed of the regulating motor 31, the reduction rate of the main reducer 21, to modulate the rotational speed of the power motor 11 in order to adjust the value of the mechanical torque transmitted by the power transmission mechanism 20 to the drive wheels 3. The irreversible reduction mechanism 33 prohibits a transmission of mechanical forces from the regulating motor 31 to the drive wheels 3 and prohibits a transmission of mechanical forces from the power transmission mechanism 20 to the regulating motor 31. Thus, the irreversible reduction mechanism allows perfect power seal between the powertrain 10 and the regulating mechanism 30.

Figure 3:
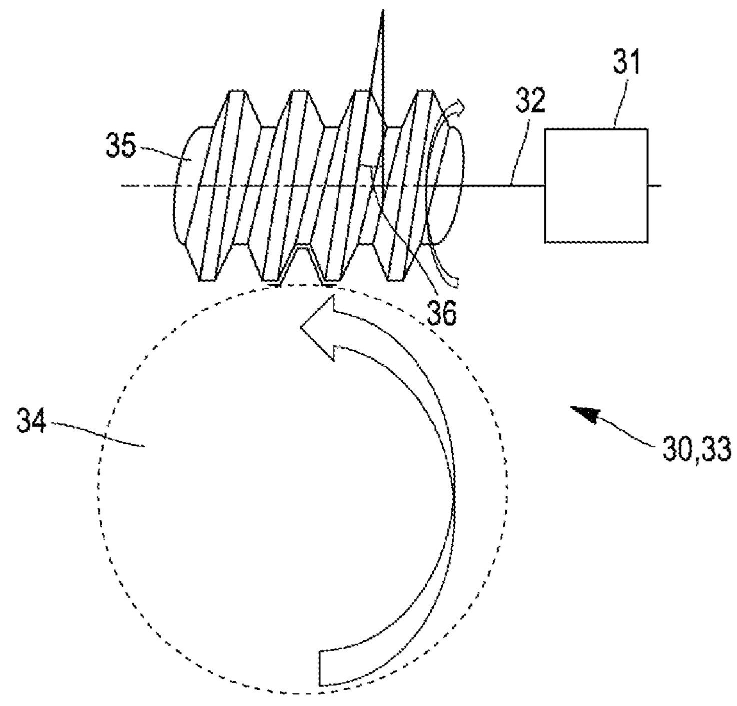
FIG. 3 is a schematic view of the regulating mechanism according to one embodiment.

As illustrated in FIGS. 1 and 2, and more precisely in FIG. 3, the irreversible reduction mechanism 33 comprises a worm and wheel system whose worm 35 is coupled in rotation with the output shaft 32 of the regulating motor 31. For example, the worm 35 of the worm and wheel system is secured in rotation to the output shaft 32 of the regulating motor 31. For its part, the wheel 34 is coupled in rotation with a planet carrier 22 of one stage of the main reducer 21. Thus, a rotation of the wheel 34 rotates said planet carrier 22 in a direction making it possible to increase the overall reduction rate of the power transmission mechanism 20. For this, the wheel 34 of the worm and wheel system can be secured in rotation to the planet carrier 22 of one stage of the at least one stage of the main reducer 21. The worm and wheel system is configured so as to have a reduction rate comprised between 1/8 and 1/12, and in particular a reduction rate equal to 1/10.

The irreversible nature of the worm and wheel system can be guaranteed by the choice of the parameters and materials of the worm 35 and of the wheel 34. For example, the worm 35 can comprise a thread having a thread angle 36 less than or equal to 6°, and in particular substantially equal to 6°. Additionally, the worm 35 and the wheel 34 of the worm and wheel system may comprise steel. More particularly, the contact surfaces between the wheel 34 and the worm 35 of the worm and wheel system can be made of greased steel. Thus and advantageously, the force induced on the worm 35 is compensated by the dynamic friction force between the worm 35 and the wheel 34, because the coefficient of friction of the steel on the steel is substantially equal to the sine of the thread angle 36. As a result, the worm and wheel system is deemed irreversible, the rotation of the wheel 34 secured in rotation to the planet carrier 22 being dependent on the rotation of the worm 35. It is then possible that the worm 35 is configured to retract, at the rotational speed of the regulating motor 31, by the force of the wheel 34 of the worm and wheel system, to thus operate the regulation by modifying the reduction rate of the main reducer 21. Thus, an increase in the speed of the regulating motor 31 implies a rise in the torque delivered to the drive wheels 3, by the power motor 11.

According to the embodiment represented in FIG. 2, the electrically-driven vehicle 1 comprises a first gear 14 and a second gear 16 disposed between the wheel 34 of the worm and wheel system and a planet carrier 22 of one of the stages of the main reducer 21. The first and second gears 14, 16 are meshed with each other, the first gear 14 is further meshed with the wheel 34 of the worm and wheel system, and the second gear 16 is secured in rotation to the planet carrier 22. For example, said first and second gears 14, 16 are mounted in series between the wheel 34 of the worm and wheel system and a planet carrier 22 of one of the stages of the reducer. This embodiment advantageously makes it possible to reduce the number of stages of the main reducer 21, by using only one stage. For example, it can be planned that the first gear 14 is two or three times smaller than the second gear 16, or vice versa.

Finally, the electrically-driven vehicle 1 comprises an electronic control unit 50 ensuring piloting of the power motor 11 and of the regulating motor 31 as a function of control laws recorded in a memory 51 of the electronic control unit 50. These control laws are at least dependent on an action on an accelerator pedal of the electrically-driven vehicle 1.

The arrangements previously described make it possible to propose an electrically-driven vehicle 1 in which an irreversible reduction mechanism 33 is used to monitor the torque of the power motor 11. The irreversible nature of the irreversible reduction mechanism 33 makes it possible to mechanically isolate the regulating motor 31 from the powertrain 10 so that no power delivered by the power motor 11 is transmitted to the regulating motor 31 and vice versa.

Figure 4:
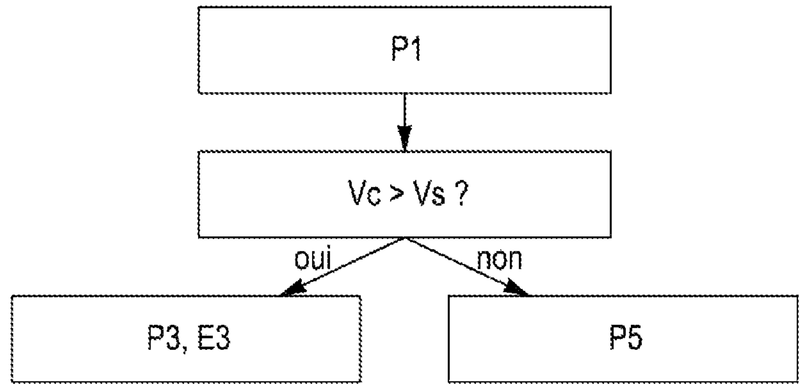
FIG. 4 is a schematic view of the piloting method according to one embodiment.
Figure 5:
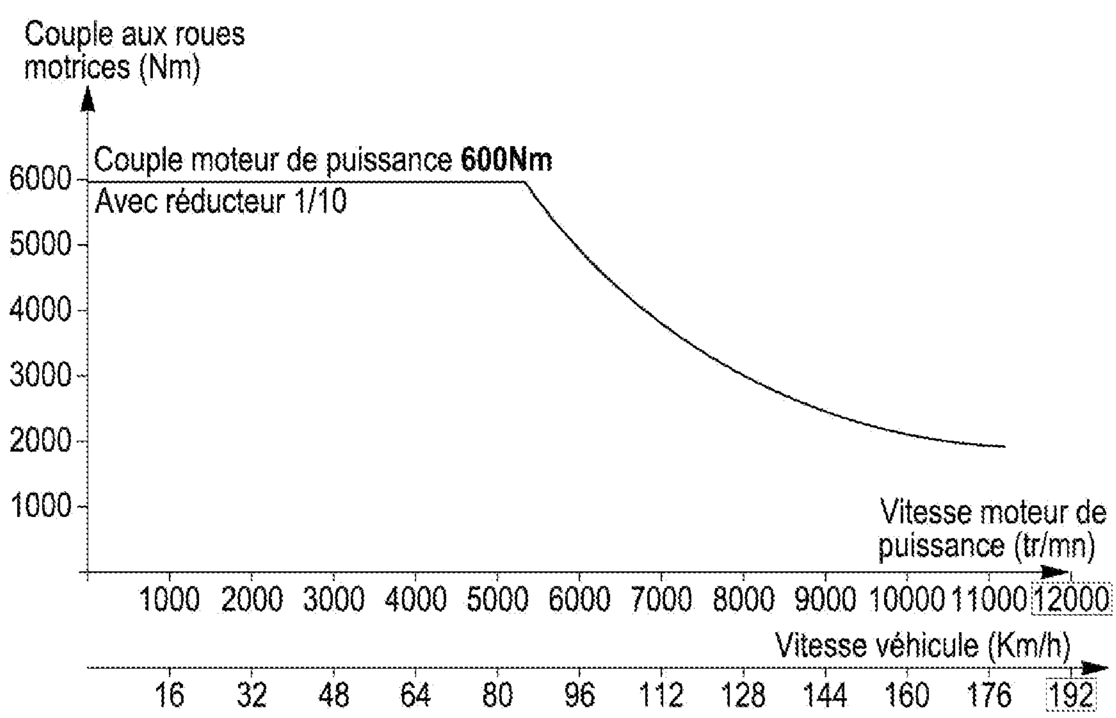
FIG. 5 is a schematic view of the evolution of the torque provided to the drive wheels as a function of the rotational speed of the power motor of an electrically-driven vehicle of the state of the art.
Figure 6:
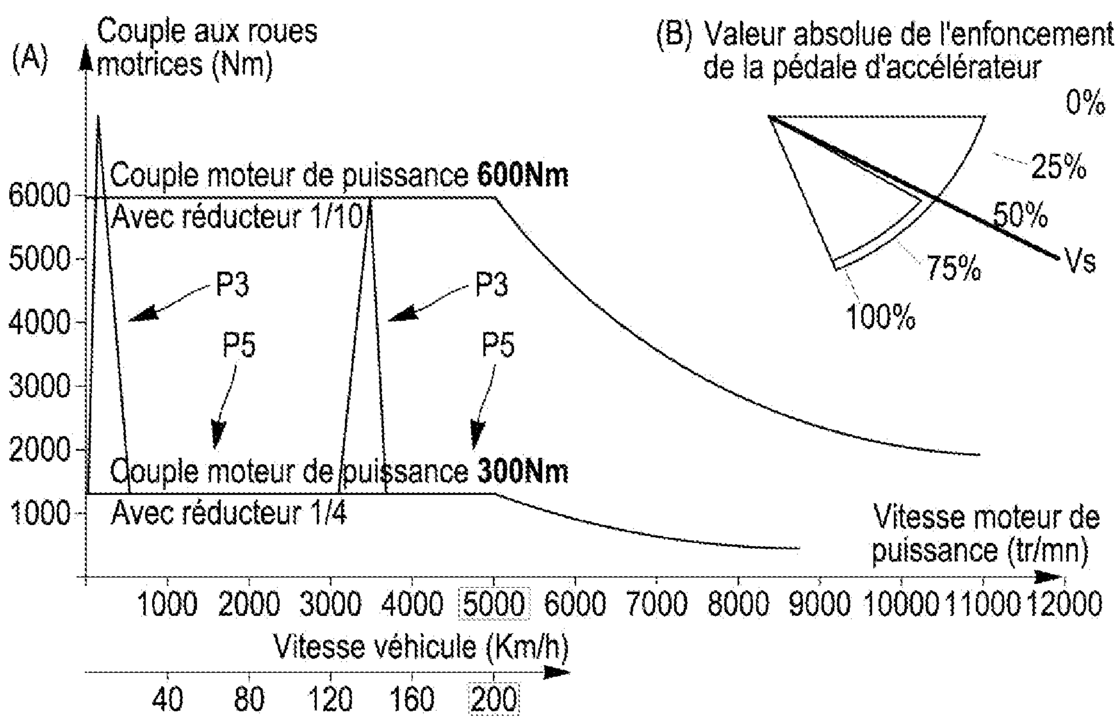
FIG. 6 is a schematic view of certain steps of the piloting method according to one embodiment.

The disclosure also concerns a method for piloting an electrically-driven vehicle 1, one embodiment of which is represented in FIGS. 4 to 6. This piloting method makes it possible to pilot an electrically-driven vehicle 1 of the type of one of those described previously, and is implemented by the control unit 50. In particular, it can be provided that the control laws stored in the memory 51 of the control unit 50 comprise all or part of the steps of the piloting method described below.

The piloting method firstly comprises a phase of receiving a setpoint P1 by the control unit 50, in which a setpoint dependent on the actuation of an accelerator pedal of the electrically-drive vehicle 1 is received. This setpoint is representative of an absolute value of a depression of the accelerator pedal Vc.

In the case where the absolute value of the depression of the accelerator pedal Vc is strictly greater than an absolute value of threshold depression Vs, the piloting method comprises the implementation of a regulation phase P3 comprising a step E3 of rotating the regulating motor 31 so as to adjust, as a function of the rotational speed of the regulating motor 31, the reduction rate of the main reducer 21, to modulate the rotational speed of the power motor 11 in order to adjust the value of the mechanical torque transmitted by the power transmission mechanism 20 to the drive wheels 3. More particularly, if the electrically-driven vehicle 1 comprises an irreversible reduction mechanism 33 comprising a worm and wheel system, during the regulation phase P3, a direction of rotation of the regulating motor 31 rotates the worm 35 of the worm and wheel system in a direction allowing said worm 35 to retract by a mechanical force of the wheel 34 on the worm. It is therefore well understood that the wheel 34 of the worm and wheel system limits the rotation of the planet carrier 22 to a speed depending on the rotational speed Va of the regulating motor 31. In other words, the irreversible reduction mechanism 33 makes it possible to reduce the reduction rate of the main reducer 11 to implement the regulation phase P3.

Figure 7:
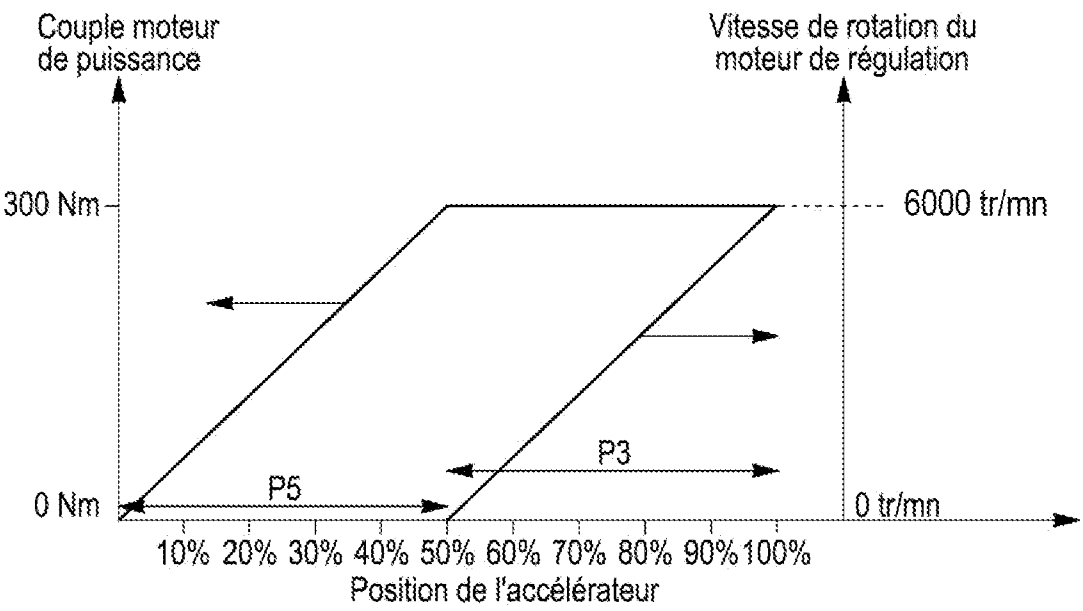
FIG. 7 is a schematic view of certain steps of the piloting method according to one embodiment.

FIGS. 5 to 7 illustrate a comparison between a method for piloting an electrically-driven vehicle (1) according to the state of the art, and an embodiment of the piloting method according to the disclosure. FIG. 5 illustrates in particular the evolution of the torque transmitted by the power motor 11 to the drive wheels 3 by an electrically-driven vehicle 1 of the state of the art. This electrically-driven vehicle 11 of the state of the art can for example have a main reducer 21 having a reduction rate of 1/10. Advantageously, such a system makes it possible to increase the speed of the electrically-driven vehicle 1 proportionally to the rotational speed of the power motor 11 up to approximately 85 km/h. However, beyond this speed, the torque transmitted to the drive wheels 3 decreases, leading to high electrical consumption of the power motor 11.

One embodiment of the piloting method according to the disclosure is represented in FIGS. 6 and 7. In particular, FIG. 6 B illustrates the travel of depression of the accelerator pedal between 0% of the total travel of depression of the accelerator pedal, and 100% of said total travel of depression of the accelerator pedal. According to this embodiment, the absolute value of threshold depression Vs is equal to 50% of the total travel of depression of the accelerator pedal. Consequently, when the absolute value of the depression of the accelerator pedal Vc is strictly greater than 50%, the regulation phase P3 is implemented, leading to an increase in the torque transmitted to the drive wheels 3, as illustrated in FIGS. 6A, and 7. Advantageously, during the regulation phase P3, the power motor 11 provides a current whose value is equal to a maximum nominal current value corresponding to a maximum current value likely to be provided by the power motor 11. It is therefore well understood that, when the absolute value of the depression of the accelerator pedal Vc is strictly greater than the absolute value of threshold depression Vs, the torque provided by the power motor 11 is equal to the nominal value of the torque of the power motor, and the rotational speed of the regulating motor 31 is modulated between 0 and a nominal rotational speed value of the regulating motor. For example, the nominal rotational speed value of the regulating motor is equal to 6000 rpm.

In all other cases, the piloting method comprises the implementation of a speed modulation phase PS5, in which a value of the current provided by the power motor 11 is modulated proportionally to the absolute value of the depression of the the accelerator pedal Vc, so as to modulate the torque transmitted by the power motor 11 to the drive wheels 3. It is therefore well understood that, when the absolute value of the depression of the accelerator pedal Vc is comprised between 0% and the absolute value of threshold depression Vs, the torque provided by the power motor 11 is modulated as a function of the absolute value of the depression of the accelerator pedal Vc between a zero torque and a nominal value of the torque of the power motor. Thus, the rotation of the regulating motor 31 makes it possible to induce an increase in the torque transmitted by the power motor 11 to the drive wheels 3, through the main reducer 21.

For example the modulation phase PS5 is implemented so that the current value provided by the power motor 11 is modulated proportionally to the absolute value of the depression of the accelerator pedal Vc between a zero current value and the maximum nominal current value.

The arrangements previously described make it possible to propose a method for piloting an electrically-driven vehicle 1 in which a regulation phase P3 is implemented to adjust the transmission of a mechanical torque to the drive wheels 3 of the vehicle as a function of the absolute value of depression of the accelerator pedal Vc. Indeed, increasing the rotational speed of the regulating motor 31 implies a rise in the torque delivered to the drive wheels 3, by the power motor 11.

The invention claimed is:

1. An electrically-driven vehicle, comprising:

drive wheels;

a powertrain including at least one electric power motor and a power transmission mechanism between said power motor and the drive wheels, the power transmission mechanism comprising a main reducer interposed between the power motor and the drive wheels, said main reducer having an epicyclic train architecture with at least one stage, where each stage comprises:

a planet carrier;

a central sun shaft centered about a reduction rotation axis;

a peripheral sun shaft externally surrounding the central sun shaft, and being coaxial with the central sun shaft about the reduction rotation axis;

at least one planetary gear, disposed between the central sun shaft and the peripheral sun shaft, meshing with the central sun shaft and the peripheral sun shaft, and being configured to rotate about the reduction rotation axis;

an accelerator pedal;

a regulating mechanism distinct from the powertrain, the regulating mechanism comprising:

an electric regulating motor;

an irreversible reduction mechanism interposed between the regulating motor and the power transmission mechanism, and acting on the power transmission mechanism in a manner making it possible to adjust, as a function of the rotational speed of the regulating motor, the reduction rate of the main reducer, to modulate a rotational speed of the power motor in order to adjust the value of the mechanical torque transmitted by the power transmission mechanism to the drive wheels, the irreversible reduction mechanism preventing a transmission of mechanical forces from the regulating motor to the drive wheels and prohibiting a transmission of mechanical forces from the power transmission mechanism to the regulating motor, said irreversible reduction mechanism being a worm and wheel system whose worm is coupled in rotation with an output shaft of the regulating motor and whose wheel is coupled in rotation with the planet carrier of one stage of said at least one stage of the main reducer, a rotation of the wheel rotating said planet carrier in a direction making it possible to increase the overall reduction rate of the power transmission mechanism;

an electronic control unit ensuring piloting of the power motor and of the regulating motor as a function of control laws recorded in a memory of the electronic control unit, said control laws being at least dependent on an action on the accelerator pedal of the electrically-driven vehicle.

2. The electrically-driven vehicle according to claim 1, comprising at least one electric energy storage system configured to supply electric energy to at least one electric motor chosen from the power motor of the powertrain and the regulating motor.

3. The electrically-driven vehicle according to claim 1, wherein the main reducer of the power transmission mechanism comprises at least two stages mounted in series.

4. The electrically-driven vehicle according to claim 1, wherein each stage has a reduction rate, said reduction rate of each stage being chosen so that an overall reduction rate of the main reducer is comprised between 1/3 and 1/5.

5. The electrically-driven vehicle according to claim 1, comprising a first gear and a second gear disposed between the wheel of the worm and wheel system and the planet carrier of one of the stages of the main reducer, said first and second gears being meshed with each other, the first gear being further meshed with the wheel of the worm and wheel system, and the second gear being secured in rotation to the planet carrier.

6. The electrically-driven vehicle according to claim 1, wherein the worm and wheel system is configured so as to have a reduction rate comprised between 1/8 and 1/12.

7. The electrically-driven vehicle according to claim 1, wherein the worm comprises a thread having a thread angle less than or equal to 6°.

8. A method for piloting an electrically-driven vehicle, for piloting an electrically-driven vehicle according to claim 1, the piloting method being implemented by the control unit and comprising:

a phase of receiving a setpoint by the control unit, in which a setpoint dependent on the actuation of the accelerator pedal of the electrically-driven vehicle is received, said setpoint being representative of an absolute value of a depression of the accelerator pedal;

in the case where the absolute value of the depression of the accelerator pedal is strictly greater than an absolute value of threshold depression, implementing a regulation phase comprising a step of rotating the regulating motor so as to adjust, as a function of the rotational speed of the regulating motor, the reduction rate of the main reducer, to modulate the rotational speed of the power motor in order to adjust the value of the mechanical torque transmitted by the power transmission mechanism to the drive wheels, a direction of rotation of the regulating motor then rotating the worm of the worm and wheel system in a direction allowing said worm to retract by a mechanical force of the wheel on the worm;

in all other cases, implementing a speed modulation phase, in which a value of the current provided by the power motor is modulated proportionally to the absolute value of the depression of the accelerator pedal, so as to modulate the torque transmitted by the power motor to the drive wheels.

9. The piloting method according to claim 8, wherein the absolute value of threshold depression is equal to 50% of a total travel of depression of the accelerator pedal.

10. The piloting method according to claim 8, wherein the modulation phase is implemented so that the current value provided by the power motor is modulated proportionally to the absolute value of the depression of the accelerator pedal between a zero current value and a maximum nominal current value corresponding to a maximum value likely to be provided by the power motor.

11. The piloting method according to claim 10, wherein, during the regulation phase, the power motor provides a current whose value is equal to the maximum nominal current value.

* * * * *